(12) United States Patent
Lee et al.

(10) Patent No.: US 9,845,868 B2
(45) Date of Patent: Dec. 19, 2017

(54) SHIFT RANGE SWITCHING DEVICE FOR VEHICLE

(71) Applicant: DAESUNG ELECTRIC CO., LTD, Gyeonggi-do (KR)

(72) Inventors: Seag Woo Lee, Gyeonggi-do (KR); Won Lee, Gyeonggi-do (KR); Yeong Gi Jo, Incheon (KR)

(73) Assignee: Daesung Electric Co., Ltd. (KR)

( * ) Notice: Subject to any disclaimer, the term of this patent is extended or adjusted under 35 U.S.C. 154(b) by 153 days.

(21) Appl. No.: 14/764,990

(22) PCT Filed: Mar. 18, 2013

(86) PCT No.: PCT/KR2013/002162
§ 371 (c)(1),
(2) Date: Jul. 31, 2015

(87) PCT Pub. No.: WO2014/133215
PCT Pub. Date: Sep. 4, 2014

(65) Prior Publication Data
US 2015/0369357 A1    Dec. 24, 2015

(30) Foreign Application Priority Data

Feb. 27, 2013 (KR) .................... 10-2013-0020912

(51) Int. Cl.
*F16H 59/08* (2006.01)
*G05G 1/08* (2006.01)
(Continued)

(52) U.S. Cl.
CPC ......... *F16H 59/08* (2013.01); *F16H 59/0213* (2013.01); *F16H 59/12* (2013.01);
(Continued)

(58) Field of Classification Search
CPC ...... F16H 59/08; F16H 59/0213; F16H 59/12; F16H 61/22; F16H 63/42;
(Continued)

(56) References Cited

U.S. PATENT DOCUMENTS 8,051,740 B2 * 11/2011 Giefer .................... B60K 37/06
74/473.21
8,264,338 B2 * 9/2012 Leon ...................... B60K 37/06
340/456
(Continued)

FOREIGN PATENT DOCUMENTS

CN        101809333 A     8/2010
DE   10 2009 039113 A1    3/2011
(Continued)

OTHER PUBLICATIONS

Chinese Office Action for Application No. 201380072818.8 dated Aug. 22, 2016.
(Continued)

*Primary Examiner* — Adam D Rogers
(74) *Attorney, Agent, or Firm* — Tarolli, Sundheim, Covell & Tummino LLP (57) ABSTRACT

A shift range switching device is provided for a vehicle. The device comprises a cover unit, a rotary unit, a control unit, and a body unit, wherein the rotary unit comprises a knob operation part exposed to the outside of the cover part, and a sensing part inserted in the knob operation part to be rotated by the knob operation part and to sense the rotation of the knob operation part. The control part comprises a parking button for shifting a transmission to a parking range, a display part for displaying the working range of the transmission and a sensor for sensing the rotation of the rotary unit. The body unit comprises a locking part coupled or decoupled from the sensing part to restrict the rotation of (Continued)

the rotary unit, and a cam into which one side of the sensing part is inserted to allow returning to the original position.

13 Claims, 12 Drawing Sheets

(51) Int. Cl.
   *F16H 59/12* (2006.01)
   *F16H 61/22* (2006.01)
   *F16H 63/42* (2006.01)
   *F16H 59/02* (2006.01)
   *F16H 61/24* (2006.01)

(52) U.S. Cl.
   CPC ............ *F16H 61/22* (2013.01); *F16H 63/42* (2013.01); *G05G 1/08* (2013.01); *F16H 2059/0295* (2013.01); *F16H 2059/081* (2013.01); *F16H 2061/243* (2013.01); *F16H 2063/423* (2013.01)

(58) Field of Classification Search
   CPC ....... F16H 2059/0295; F16H 2059/081; F16H 2061/243; F16H 2063/423; F16H 2059/082; Y10T 74/2014; Y10T 74/20474; G05G 1/08; G05G 1/10; G05G 1/12
   See application file for complete search history.

(56) References Cited

U.S. PATENT DOCUMENTS

| | | | |
|---|---|---|---|
| 8,359,943 B2* | 1/2013 | Seki | B60K 37/06 74/473.21 |
| 9,212,740 B2* | 12/2015 | Watanabe | F16H 59/08 |
| 9,410,614 B2* | 8/2016 | Muraki | F16H 59/08 |
| 9,620,309 B2* | 4/2017 | Hoskins | F16H 59/08 |
| 2006/0037424 A1 | 2/2006 | Pickering et al. | |
| 2006/0053930 A1 | 3/2006 | Morita et al. | |
| 2007/0074956 A1 | 4/2007 | Koehler et al. | |
| 2007/0261509 A1 | 11/2007 | Meyer et al. | |
| 2015/0285351 A1* | 10/2015 | Rake | G05G 1/08 74/436 |

FOREIGN PATENT DOCUMENTS

| | | | | |
|---|---|---|---|---|
| EP | 2 055 994 A2 | | 5/2009 | |
| JP | 2000-62491 A | | 2/2000 | |
| JP | GB 2362932 A | * | 12/2001 | ............ B60K 37/06 |
| JP | 2004-87307 A | | 3/2004 | |
| JP | 2006069368 A | | 3/2006 | |
| JP | 2007186118 A | | 7/2007 | |
| JP | 2010-105623 A | | 5/2010 | |
| JP | 2010-535659 A | | 11/2010 | |
| JP | 2012-153315 A | | 8/2012 | |
| JP | WO 2017022160 A1 | * | 2/2017 | ............ B60K 20/02 |
| KR | 100604441 B1 | | 7/2006 | |
| KR | 10-0649164 A | | 11/2006 | |
| KR | 10-2010-0018746 A | | 2/2010 | |
| KR | 20100070593 A | | 6/2010 | |
| KR | 10-2010-0083981 A | | 7/2010 | |
| KR | 10-2010-0090826 A | | 8/2010 | |
| KR | 10-2010-0138521 A | | 12/2010 | |
| KR | 10-1088690 A | | 12/2011 | |
| KR | 20120024324 A | | 3/2012 | |
| KR | 101158612 B1 | | 6/2012 | |
| KR | 10-2012-0139881 A | | 12/2012 | |

OTHER PUBLICATIONS

Extended European Search Report for Application No. 13876519.3 dated Aug. 23, 2016.
International Search Report for PCT/KR2013/002162, dated Jul. 10, 2013, pp. 1-4.
Korean Office Action for Application No. 10-2013-0020912 dated Dec. 19, 2013.
Notice of Rejection for Japanese Application No. 2015-555896 dated Aug. 2, 2016.

* cited by examiner

[Linear Sensor Characteristic]

SHIFT RANGE SWITCHING DEVICE FOR VEHICLE

RELATED APPLICATIONS

The present invention is a U.S. National Stage under 35 USC 371 patent application, claiming priority to Serial No. PCT/KR2013/002162, filed on 18 Mar. 2013; which claims priority from KR10-2013-0020912, filed 27 Feb. 2013, the entirety of both of which are incorporated herein by reference.

TECHNICAL FIELD

The present invention relates to a shift range switching device for a vehicle, and more particularly, to a shift range switching device for a vehicle, capable of controlling a shift range of a vehicle through a rotatably installed knob and allowing a transmission to be shifted to a parking range irrespective of a working shift range.

BACKGROUND ART

A vehicle such as a car has various functions capable of providing a more stable and comfortable traveling state for a user in addition to a function as a moving means. An engine and a transmission as core driving components of the vehicle have been developed to be electronically controlled, and further a variety of components of the vehicle were digitized or have been developed to be digitized.

Meanwhile, a vehicle equipped with an automatic transmission is rapidly increased for smoothly and easily traveling under heavy traffic conditions in downtown. When a driver sets a desired shift range using a shift lever, the shift range set by the driver is transferred to a TCU (Transmission Control Unit) for performing control of the transmission and various control units, so that the control units control supply and cut-off of power when the vehicle is started and electrically control setting and releasing of another shift range and a reverse shift range in the shift range set during traveling of the vehicle.

Such a shift range switch for a vehicle is disclosed in Korean Patent No. 10-1158612 and U.S. Patent Laid-Open Publication No. 20070261509.

The shift range switch for a vehicle according to the related art may be inconvenient in that a driver changes a transmission to a parking range in a state in which a knob is set to be at a parking position when restarting a vehicle. In addition, there is a problem in that the shift range switch has a complicated structure and an increased size since the shift range switch has a motor and gearings for automatically adjusting the position of the knob in order to resolve the above inconvenience.

DISCLOSURE

Technical Problem

Accordingly, the present invention has been made in view of the above-mentioned problem, and an object thereof is to provide a shift range switching device for a vehicle, capable of allowing a transmission to be automatically shifted to a parking range when ignition of a vehicle is turned off, to thereby resolve inconvenience of setting a knob to be at a parking position when the vehicle is restarted.

In addition, another object of the present invention is to provide a shift range switching device for a vehicle, capable of allowing a transmission to be shifted to a parking range, irrespective of a position of a knob or a working range of the transmission.

In addition, still another object of the present invention is to provide a shift range switching device for a vehicle, capable of allowing a knob to be self-returned to a fixed neutral position through a simple structure.

In addition, a further object of the present invention is to provide a shift range switching device for a vehicle, capable of allowing a driver to visually recognize a set shift range of a vehicle to safely and easily operate a transmission.

Technical Solution

In accordance with an aspect of the present invention, a shift range switching device for a vehicle includes a cover part, a rotary unit including a knob operation part exposed to the outside of the cover part, and a sensing part inserted in the knob operation part so as to be rotated by the knob operation part and to sense the rotation of the knob operation part, a control unit including a parking button for shifting a transmission to a parking range, a display part for displaying a working range of the transmission, and a sensor for sensing the rotation of the rotary unit, and a body part including a locking part coupled to or decoupled from the sensing part to restrict the rotation of the rotary unit, a cam in which one side of the sensing part is inserted to allow returning to an original position when the knob operation part is rotated, and a body receiving the locking part and the cam.

The cover part may further include a middle cover disposed between the knob operation part and the sensing part. The middle cover may have an opening part formed on one side thereof so as not to protrude toward an outer peripheral surface of the cover part. The middle cover may be formed so as to be upwardly inclined in an opposite direction from the opening part.

The sensing part may include a shaft one end of which is inserted in a lower portion of the knob operation part, the shaft having a through-hole formed to intersect with a longitudinal direction of the shaft in the vicinity of the other end thereof, and a moving block formed between both ends of the shaft, the control unit may include a substrate arranged between the knob operation part and the sensing part, and the parking button, the display part, and the sensor may be electrically connected to the substrate.

The moving block may have a magnet coupled to an upper side thereof. The magnet may have a circular arc shape, and have both polarities divided in a longitudinal direction thereof.

The moving block may have a plurality of protrusion parts formed on a lower side thereof so as to protrude toward an outer peripheral surface of the moving block.

The sensing part may further include a slide pin inserted in the through-hole so as to protrude to both sides thereof, and an elastic member interposed between both ends of the slide pin.

The cam may be arranged such that the both ends of the slide pin come into sliding contact with the cam. The cam may have two fixed positions on an inner peripheral surface thereof for allowing the slide pin to protrude to the maximum, and left and right sides of each fixed position may be inclined toward the fixed position.

The sensor may be disposed in the vicinity of the magnet in the lower side of the substrate. The parking button may be connected to the substrate through a switch having elastic restoring force.

The locking part may include a solenoid received in the body part, a locking member coupled to the solenoid to be moved forward and backward, and a guide member for guiding forward and backward movement of the locking member on a side of the locking member.

The locking member may have locking grooves facing protrusion parts of the moving block, and the rotation of the rotary unit may be restricted when the protrusion parts are inserted in the locking grooves through movement by the solenoid.

Advantageous Effects

In accordance with the present invention, it may be possible to resolve inconvenience of setting a knob to be at a parking position when a vehicle is restarted by automatically shift a transmission to a parking range when ignition of the vehicle is turned off.

In addition, since the present invention has a parking button for shifting the transmission to the parking range by an operation of a driver, it may be possible to shift the transmission to the parking range irrespective of a position of the knob or a working range of the transmission.

In addition, the present invention may self-return the knob to a fixed neutral position through a stepped portion formed on an inner peripheral surface of a cam in which a portion of the knob is inserted and a slide pin coupled to the knob to come into elastic contact with the inner peripheral surface of the cam.

In addition, it may be possible to safely and easily operate the transmission by irradiating the working range of the transmission with light through a display part so as to visually recognize the shift range of the vehicle set by the driver.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Reference will now be made in detail to embodiments of the present invention, examples of which are illustrated in the accompanying drawings. In the drawings, the thickness or size of each line is exaggerated, omitted, or schematically illustrated for convenience of description and clarity. In addition, terms used herein are terms defined in consideration of functionality of the present invention, and it may be variable depending on the intention or practice of a user or an operator. Therefore, such terms should be determined based on the entire content disclosed herein.

Figure 1:
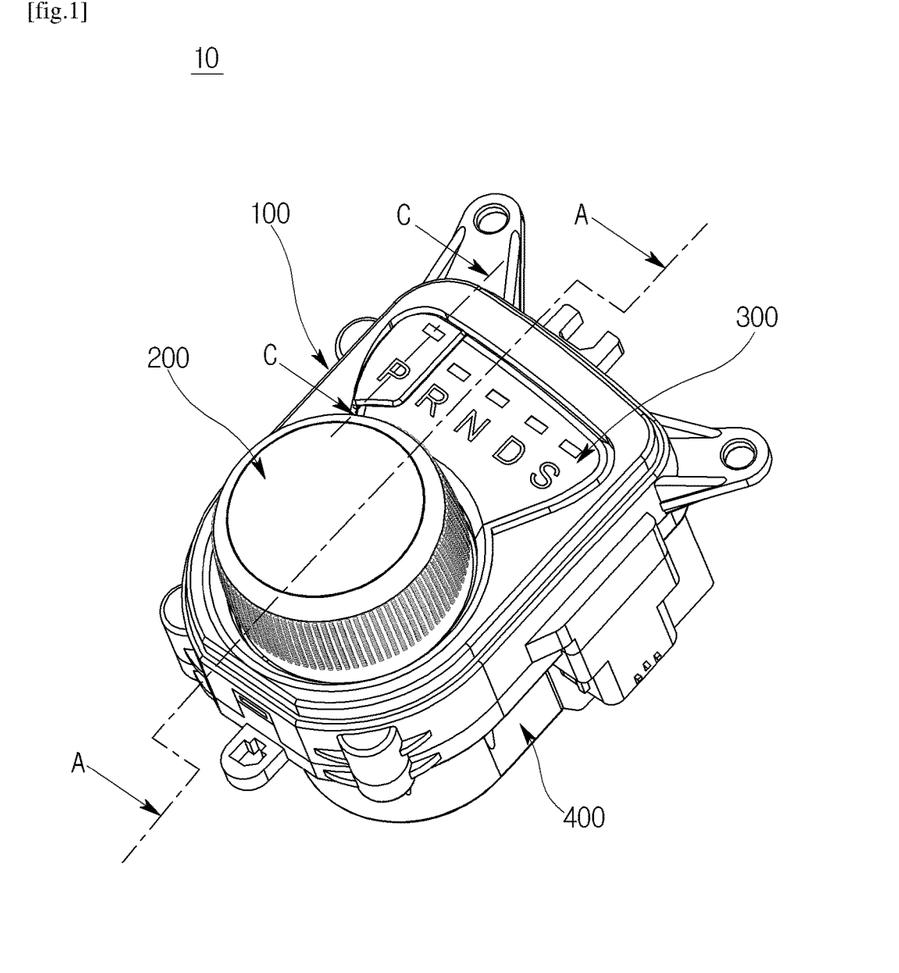
FIG. 1 is a perspective view illustrating a shift range switching device for a vehicle according to an embodiment of the present invention.
Figure 2:
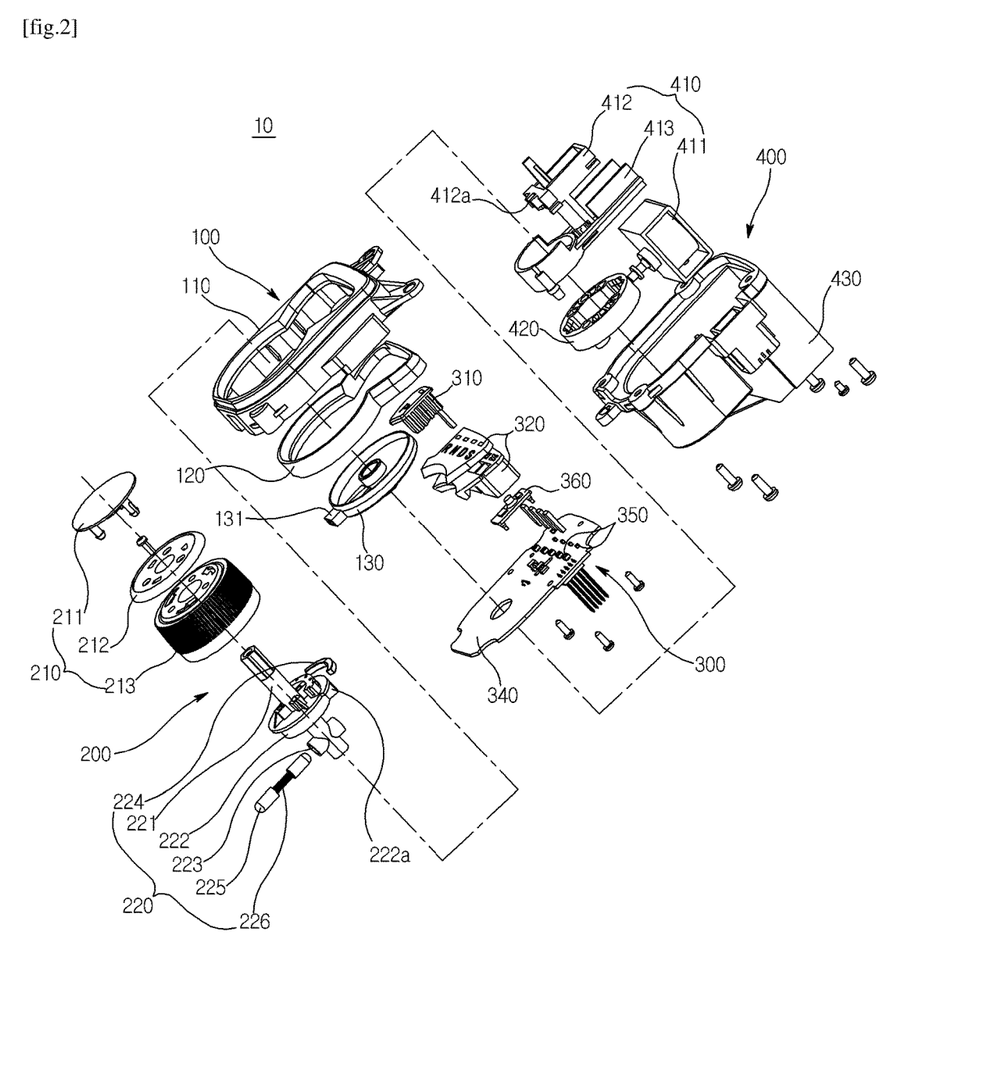
FIG. 2 is an exploded perspective view illustrating the shift range switching device for a vehicle of FIG. 1.
Figure 3:
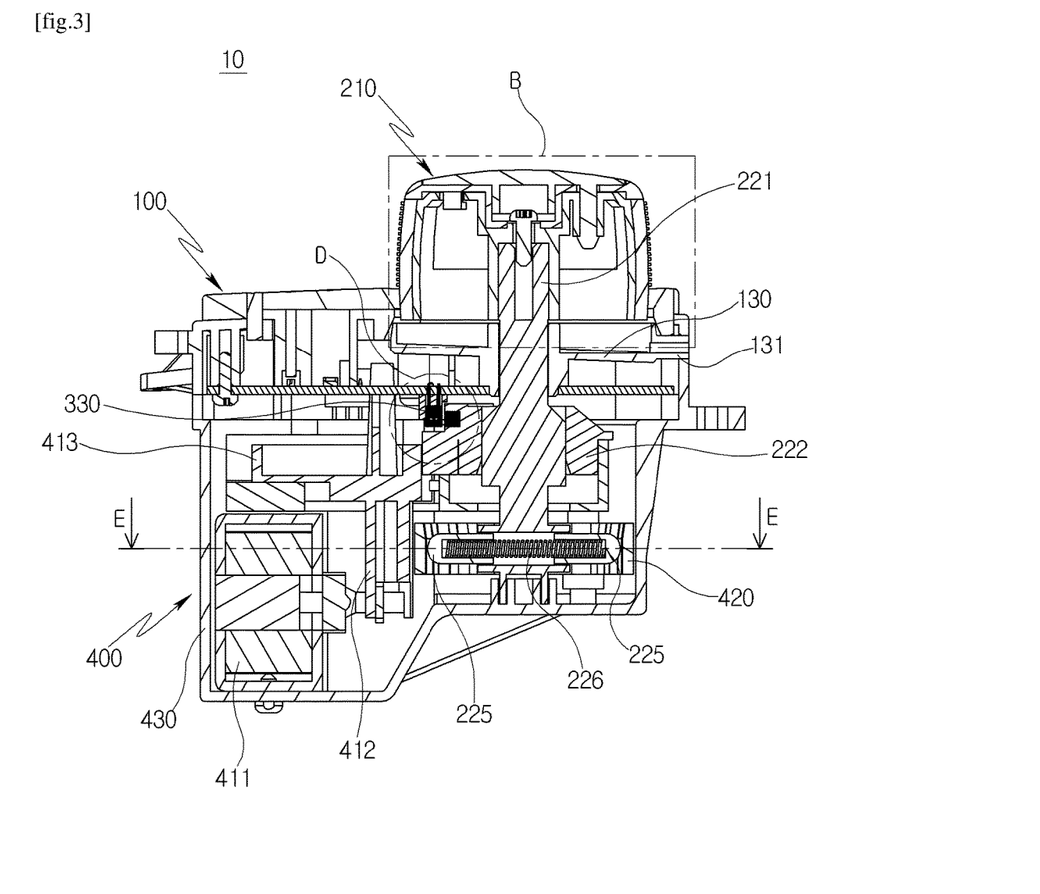
FIG. 3 is a cross-sectional perspective view taken along line "A-A" in the shift range switching device for a vehicle of FIG. 1.

FIG. 1 is a perspective view illustrating a shift range switching device for a vehicle according to an embodiment of the present invention. FIG. 2 is an exploded perspective view illustrating the shift range switching device for a vehicle of FIG. 1. FIG. 3 is a cross-sectional perspective view taken along line "A-A" in the shift range switching device for a vehicle of FIG. 1.

Referring to FIGS. 1 to 3, a shift range switching device for a vehicle 10 according to an embodiment of the present invention includes a cover part 100, a rotary unit 200 which is exposed to the outside of the cover part 100 and is rotatably installed to the cover part 100, a control unit 300 which controls and displays a working range of a transmission by rotation of the rotary unit 200, and a body part 400 which receives a locking part 410 for restricting the rotation of the rotary unit 200 and a cam 420 for returning the rotary unit 200. The shift range switching device for a vehicle 10 may shift a shift range of a vehicle by rotating the rotary unit 200 by a driver's operation.

The cover part 100 is formed such that portions of the rotary unit 200 and the control unit 300 are exposed to the outside thereof. The cover part 100 includes a top cover 110 arranged at an outer side thereof, a covering 120 inserted in the top cover 110, and a middle cover 130 coupled to a lower portion of the covering 120. The top cover 110 surrounds a knob operation part 210 of the rotary unit 100 and a display part 320 of the control unit 300, which are described later, so as to fix positions thereof.

Figure 4:
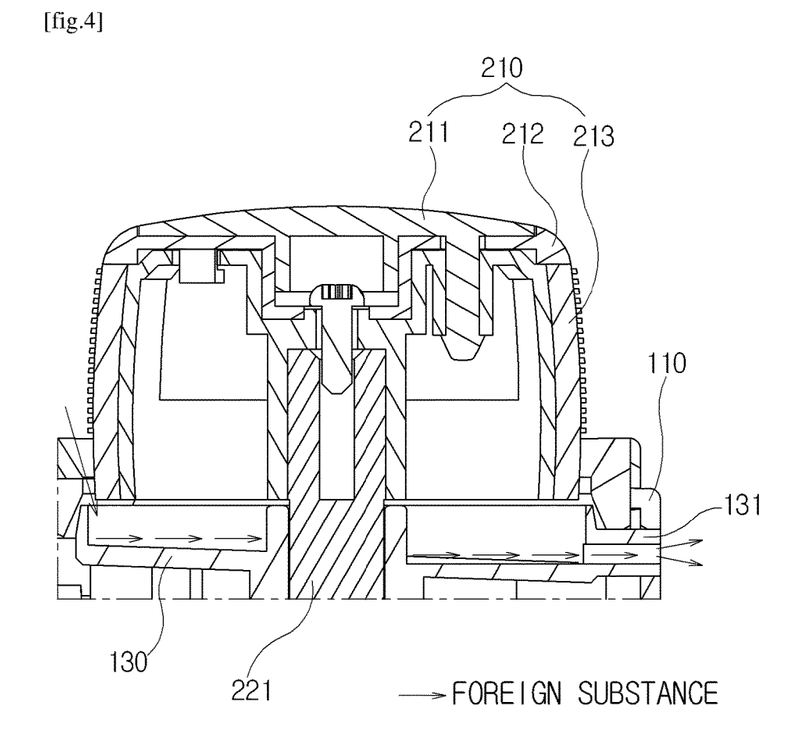
FIG. 4 is an enlarged view of portion "B" of FIG. 3 for illustrating a middle cover.

The middle cover 130 is coupled to the lower portion of the covering 120 so as to be arranged between the knob operation part 210 and a sensing part 220 to be described later. The middle cover 130 has an opening part 131 formed on one side thereof so as not to protrude toward an outer peripheral surface of the cover part 100. As shown in FIG. 4, the middle cover 130 is formed so as to be upwardly inclined in an opposite direction from the opening part 131. The middle cover 130 allows foreign substances (liquids) introduced through the knob operation part 210 to flow toward the opening part 131 by inclination of the middle cover 130 and to be discharged to the outside through the opening part 131, thereby preventing the foreign substances from being introduced into the control unit 300 and the body part 400 located beneath the cover part 100.

The rotary unit 200 includes the knob operation part 210 exposed to the outside of the cover part 100, and the sensing part 220 inserted in the knob operation part 210 so as to be rotated by the knob operation part 210 and sense rotation of the knob operation part 210. The rotary unit 200 shifts the shift range of the vehicle by rotating the sensing part 220 through the knob operation part 210 rotated by the driver's operation.

The knob operation part 210 includes a knob cap 211, a knob ring 212 configured such that the knob cap 211 is inserted in an upper portion of the knob ring 212, and a knob 213 coupled with the knob cap 211 together with the knob ring 212. The knob 213 has protrusions surrounding an outer peripheral surface thereof such that the driver easily turns the knob 213.

The sensing part 220 includes a shaft 221 one end of which is inserted in a lower side of the knob 213, a moving block 222 formed between both ends of the shaft 221 so as to protrude toward an outer peripheral surface of the shaft 221, and a through-hole 223 formed to intersect with a longitudinal direction of the shaft 221 in the vicinity of the other end thereof. In addition, the sensing part 220 includes a magnet 224 coupled to an upper side of the moving block 222, a slide pin 25 inserted in the through-hole 223, and an elastic member 226 interposed between both ends of the slide pin 225.

The shaft 221 may be formed in a column having a polygonal cross-sectional shape such that one end of the shaft 221 inserted in the knob 213 rotates along with turning of the knob 213. In addition, the shaft 221 may be screwed to the knob 213 such that one end of the shaft 221 inserted in the knob 213 is not decoupled from the knob 213.

The moving block 222 may have a cylindrical shape so as to protrude toward an outer peripheral surface thereof between the both ends of the shaft 221. The magnet 224 is coupled to an upper side surface of the moving block 222. The moving block 222 has a plurality of protrusion parts 222a formed on a lower side surface thereof so as to protrude toward the outer peripheral surface of the moving block 222. The magnet 224 has a circular arc shape, and has both polarities divided in a longitudinal direction thereof. The protrusion parts 222a are inserted in or released from the locking part 410 to be described later, thereby enabling the rotary unit 200 to be rotated or not rotated.

The slide pin 225 is coupled to the shaft 221 by the elastic member 226 interposed between the both ends thereof, and is inserted in the through-hole 223 so as to protrude to both sides thereof. The slide pin 225 may come into sliding contact with an inner peripheral surface of the cam 420 to be described later, and be inserted into the through-hole 223 through contact with the cam 420. In addition, the slide pin 225 is provided with elastic force so as to protrude outward of the through-hole 223 by the elastic member 226. One end of the slide pin 225 coming into contact with the cam 420 has a rounded hemispheric shape.

The control unit 300 includes a parking button 310 for shifting the transmission to a parking range by sensing the rotation of the rotary unit 200, a display part 320 for displaying a working range of the transmission, and a sensor 330 for sensing the rotation of the rotary unit 200. The control unit 300 includes a substrate 340 arranged between the knob operation part 210 and the sensing part 220. The parking button 310, the display part 320, and the sensor 330 are electrically connected to the substrate 340. The control unit 300 senses the rotation of the rotary unit 200 through the sensor 330, and sends shift signals according to the rotation of the rotary unit 200 to adjust the shift range of the vehicle. In addition, the control unit 300 displays a set shift range by turning on or off the parking button 310 or a light source 350 of the display part 320 according to the set shift range.

Figure 5:
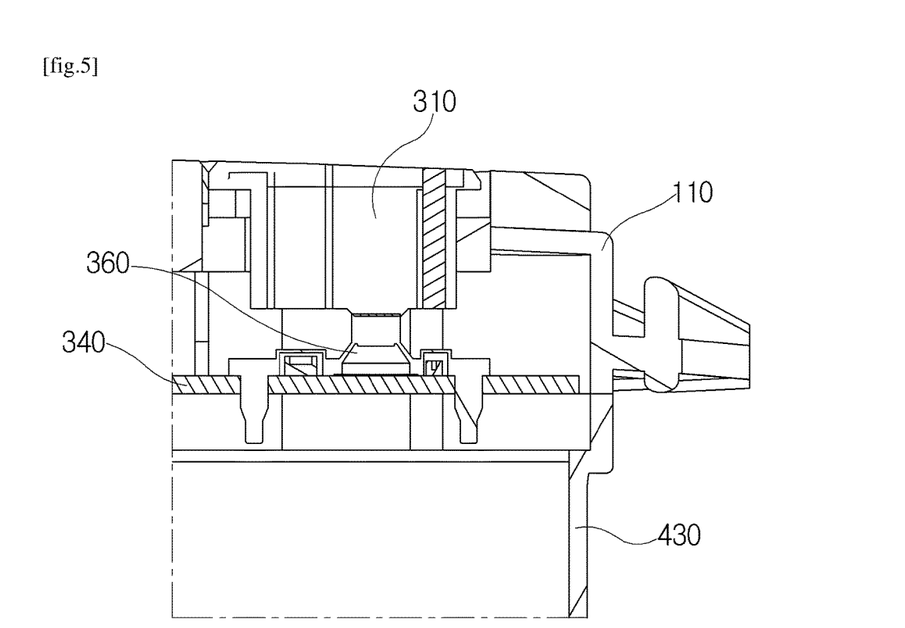
FIG. 5 is a cross-sectional perspective view taken along line "C-C" of FIG. 1 for illustrating a parking button.

The parking button 310 may shift the transmission to the parking range irrespective of the working shift range. As shown in FIG. 5, the parking button 310 is connected to the substrate through a switch 360 coupled to a lower portion of the parking button 310. The switch 360 has elastic restoring force, and thus allows the parking button 310 to be returned to an original position after pressing the parking button 310.

The display part 320 is configured such that shift ranges as symbols such as R (reverse), N (neutral), D (drive), and S (slope or second shift stage) are displayed on an upper portion of the display part 320 and a working state of each range is displayed using the light source 350. The display part 320 may display the shift ranges as other characters or numbers according to types of transmissions.

Figure 6:
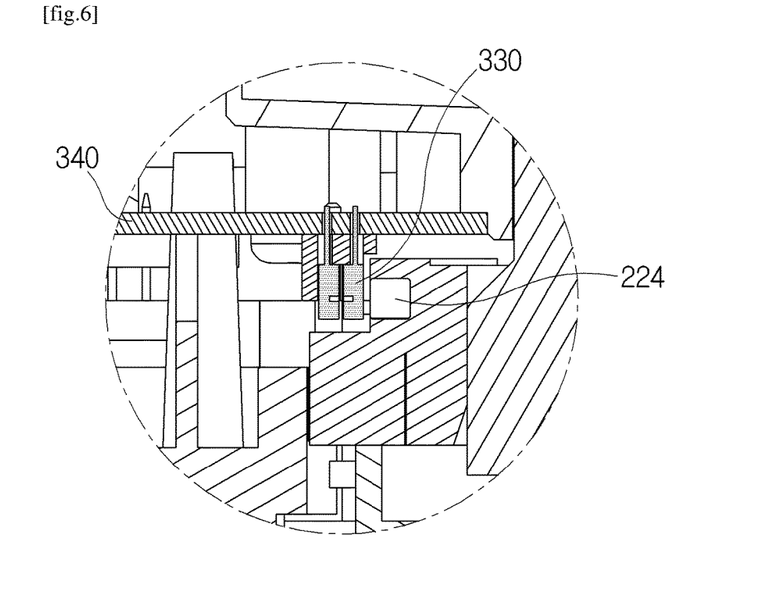
FIG. 6 is an enlarged view of portion "D" of FIG. 3 for illustrating a sensor.

As shown in FIG. 6, the sensor 330 is arranged at a lower portion of the substrate 340 so as to be spaced apart from the magnet 224. The sensor 330 senses the rotation of the rotary unit 200 using a voltage value of the sensor 330 according to a change in magnetic force of the magnet 224 moved along with the rotation of the rotary unit 200.

The body part 400 includes a locking part 410 coupled to or decoupled from the sensing part 220 to restrict the rotation of the rotary unit 200, a cam 420 in which one side of the sensing part 220 is inserted to allow returning to an original position when the knob operation part 210 is rotated, and a body 430 receiving the locking part 410 and the cam 420.

The locking part 410 includes a solenoid 411 received in the body 430, a locking member 412 coupled to the solenoid 411 to be moved forward and backward, and a guide member 413 for guiding forward and backward movement of the locking member 412 on a side of the locking member 412. The locking part 410 has locking grooves 412a formed on the locking member 412 so as to face the protrusion parts 222a of the moving block 222. The rotary unit 200 is restricted from rotating when the protrusion parts 222a are inserted in the locking grooves 412a of the locking member 412 moved by the solenoid 411. In addition, the rotary unit 200 is able to rotate when the protrusion parts 222a are decoupled from the locking grooves 412a.

Figure 7:
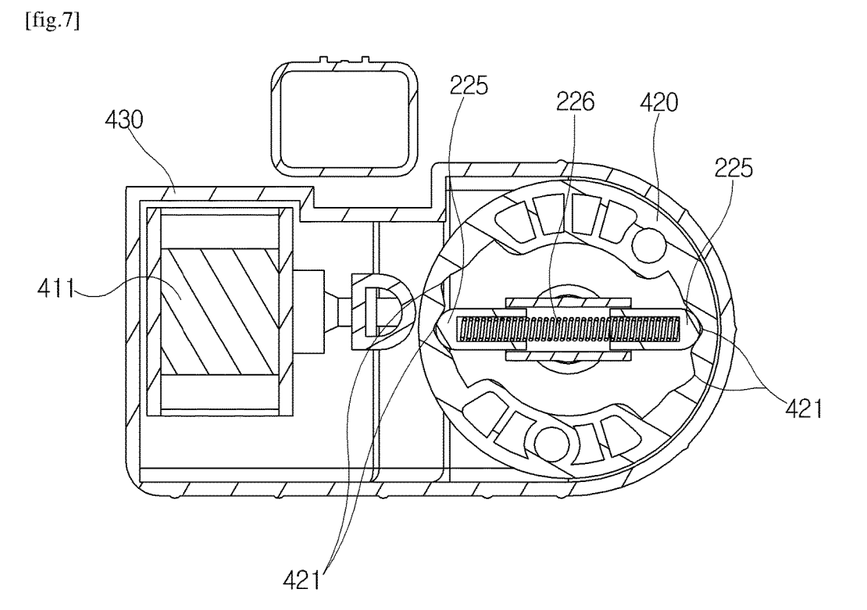
FIG. 7 is a cross-sectional perspective view taken along line "E-E" of FIG. 3 for illustrating a cam.

The cam 420 is arranged beneath the locking member 412 such that the both ends of the slide pin 225 come into sliding contact with the inner peripheral surface of the cam 420. As shown in FIG. 7, the cam 420 is disposed at a position facing the slide pin 225 in the body 430. The cam 420 has two fixed positions 421 on the inner peripheral surface thereof for allowing the slide pin 225 to protrude to the maximum. The left and right sides of each fixed position 421 are inclined toward the fixed position.

Accordingly, the slide pin 225 is deviated from the fixed position when the rotary unit 200 is rotated, and is returned to a position at which the slide pin 225 protrudes to the maximum by the elastic force of the elastic member 226. That is, when the rotary unit 200 is rotated by the operation of the driver and then the operation force of the driver is removed, the slide pin 225 is returned to the maximally protruding fixed position 421 by the elastic force of the elastic member 226 and the inclination of the cam 420 and is self-returned to a position before the rotation by rotating the rotary unit 200 together.

Figure 8:
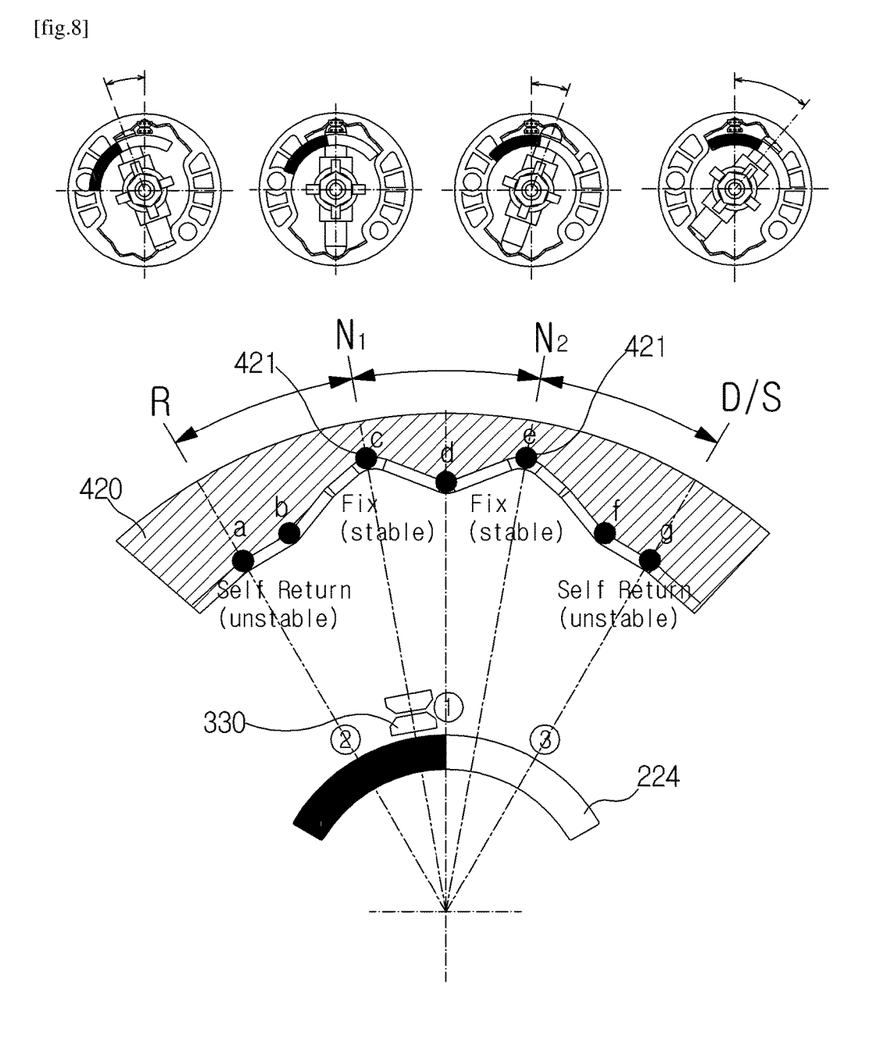
FIG. 8 is a view illustrating positions of a sensing part and a cam according to a rotation position of a rotary unit in FIG. 1.
Figure 9:
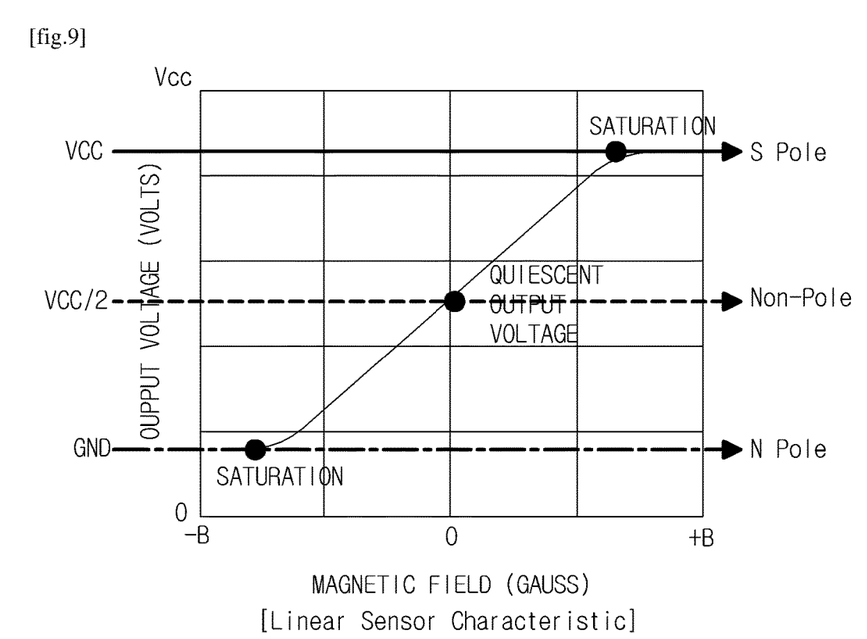
FIG. 9 is a graph illustrating voltage characteristics of the sensor according to rotation of the rotary unit in FIG. 8.

FIG. 8 is a view illustrating positions of the sensing part and the cam according to a rotation position of the rotary unit in FIG. 1. FIG. 9 is a graph illustrating voltage characteristics of the sensor according to the rotation of the rotary unit in FIG. 8.

Referring to FIGS. 8 and 9, the slide pin 225 is positioned at the fixed position 421 (c or e) when the driver does not operate the rotary unit 200. In this case, the transmission is positioned in a neutral range. When the driver operates the rotary unit 200 such that the transmission is in the R (reverse) range, the slide pin 225 passes a bent portion "b" and moves to a position "a" from the fixed position 421 so as to provide an operation feeling for the driver. In this case, when the operation force of the driver is removed, the slide pin 225 is returned to the fixed position 421 by the elastic force of the elastic member 226 and the inclination of the inner peripheral surface of the cam 420.

In addition, when the driver operates the rotary unit 200 such that the transmission is in the D (drive) or S (slope or second shift stage) range, the slide pin 225 passes a bent portion "f" and moves to a position "g" from the fixed position 421 so as to provide the operation feeling for the driver. In this case, when the operation force of the driver is removed, the slide pin 225 is returned to the fixed position 421 by the elastic force of the elastic member 226 and the inclination of the inner peripheral surface of the cam 420.

The sensor 330 outputs signals as shown in FIG. 9 according to the rotation of the rotary unit 200. That is, the sensor 330 is set such that a voltage value output when the rotary unit 200 is at a maximum stroke is within a certain section smaller than that between minimum and maximum voltage values output from the sensor 330. This is to prevent that an error state is not distinguished due to overlapping of a voltage value in an operating section with the minimum or maximum voltage value output when the sensor 330 is short-circuited.

In order to resolve this problem, a voltage value at a maximum stroke point may be set using a programmable linear hall sensor, or a hall sensor capable of obtaining a desired voltage value at the maximum stroke may be used in consideration of sensitivity of the sensor 330.

FIGS. 10A to 10D are views illustrating a change of the shift range according to turning of the knob operation part in FIG. 1.

Figure 10A:
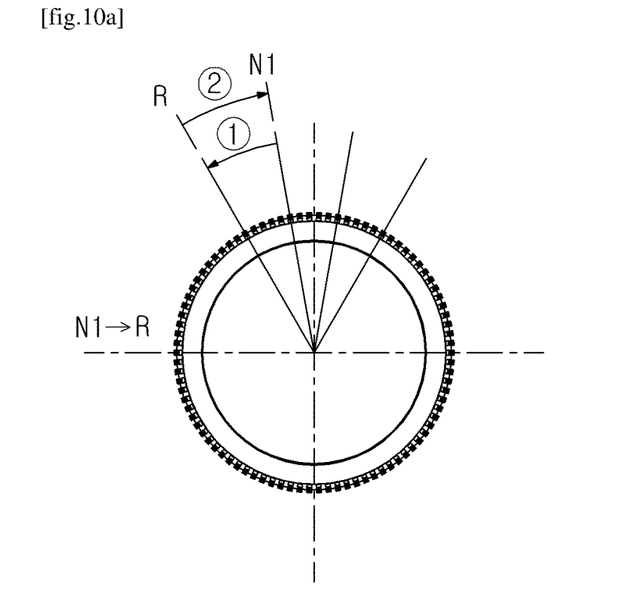
FIGS. 10A to 10D are views illustrating a change of a shift range according to turning of a knob operation part in FIG. 1.

Referring to FIGS. 10A to 10D, the shift range of the transmission is determined according to the turning of the knob operation part 210. When the knob operation part 210 is turned once in a counterclockwise direction from a fixed N1 position and then the external force of the driver is moved, the knob operation part 210 is self-returned again to the N1 position. Consequently, setting of the transmission to be in the R range may be completed (FIG. 10A).

Figure 10B:
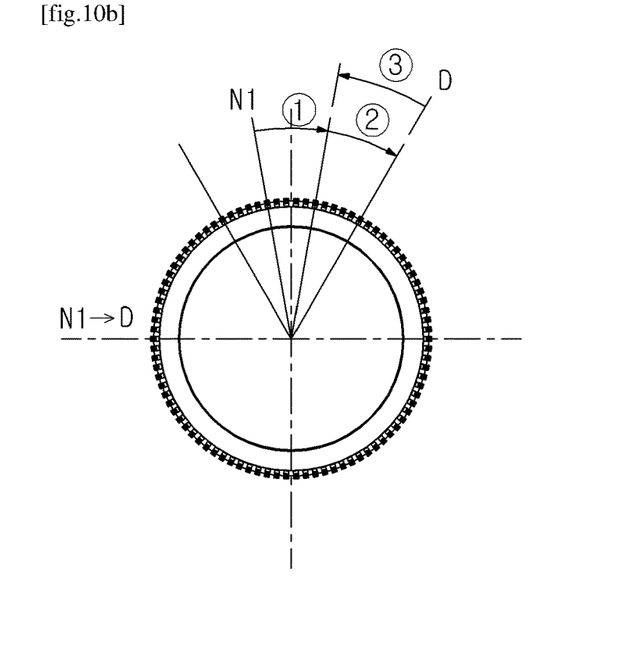

In addition, in order to set the transmission to be in the D range, the knob operation part 210 is turned twice in a clockwise direction from the fixed N1 position and is then self-returned to an N2 position by removing the external force of the driver. Consequently, setting of the transmission to be in the D range may be completed (FIG. 10B).

Figure 10C:
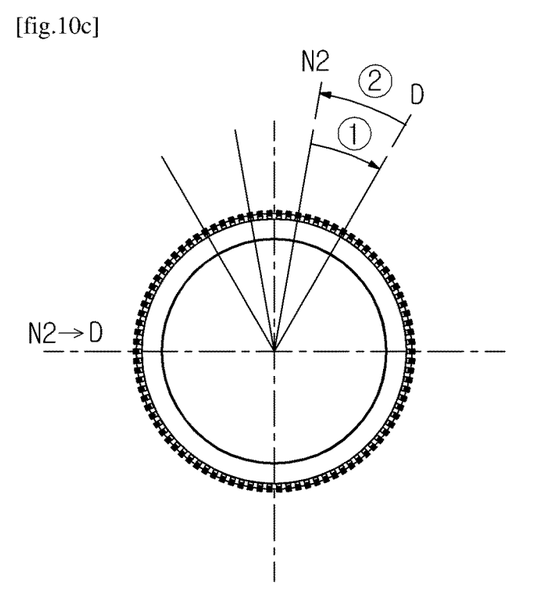
Figure 10D:
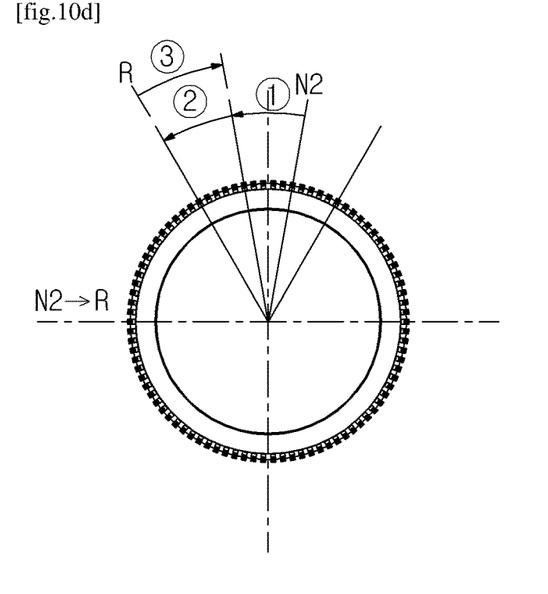

When the knob operation part 210 is turned once in the clockwise direction from the fixed N2 position and then the external force of the driver is moved, the knob operation part 210 is self-returned again to the N2 position. Consequently, setting of the transmission to be in the D range may be completed (FIG. 10C). In addition, in order to set the transmission to be in the R range, the knob operation part 210 is turned twice in the counterclockwise direction from the fixed N2 position and is then self-returned to the N1 position by removing the external force of the driver. Consequently, setting of the transmission to be in the R range may be completed (FIG. 10D). In addition, in order to select the S range of the transmission, the transmission may be set to be in the S range when the D range is selected and then a selection process of the D range is performed once again.

Figure 11:
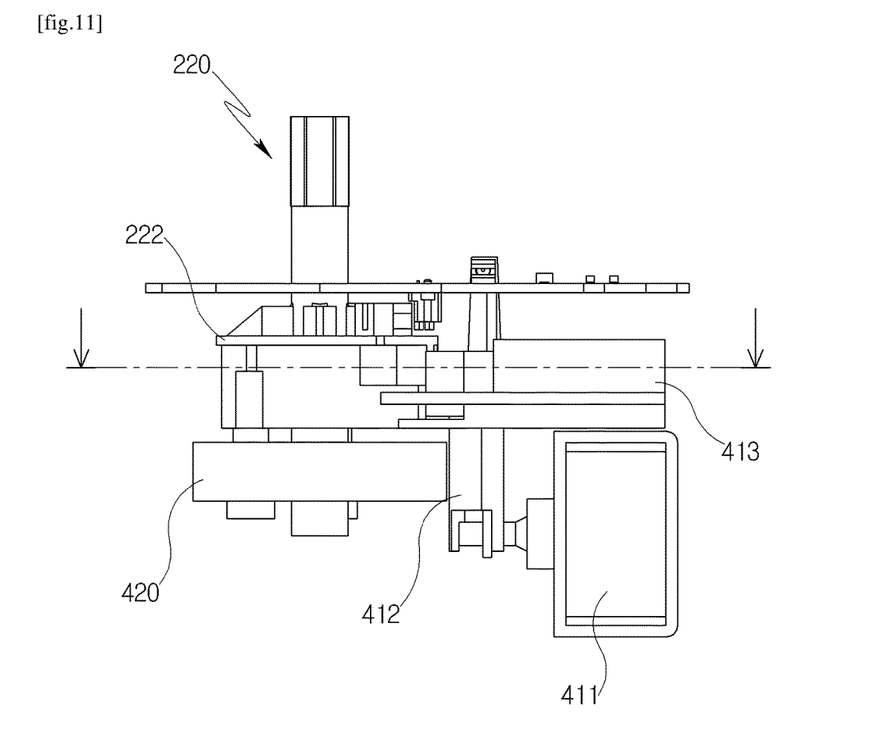
FIG. 11 is a view illustrating a sensing part and a locking part in FIG. 1.
Figure 12A:
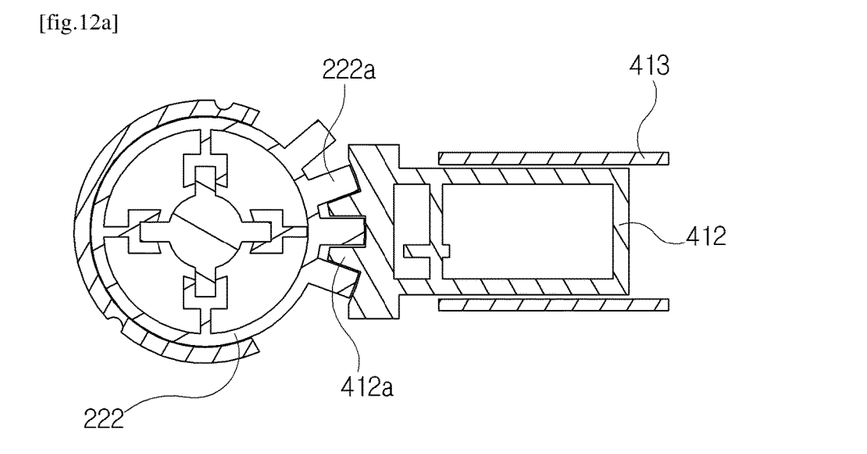
FIGS. 12A and 12B are views illustrating a locked or unlocked state between the sensing part and the locking part in FIG. 11.

FIG. 11 is a view illustrating the sensing part and the locking part in FIG. 1. FIG. 12A is a view illustrating a locked state between the sensing part and the locking part in FIG. 11 and FIG. 12B is a view illustrating an unlocked state between the sensing part and the locking part in FIG. 11.

Figure 12B:
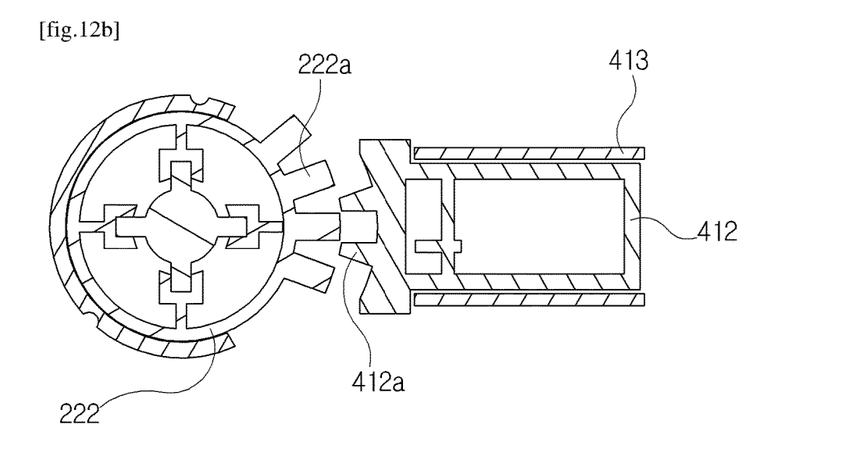

Referring to FIGS. 11 to 12B, the sensing part 220 may be restricted from rotating by the locking part 410. That is, the rotation of the sensing part 220 may be restricted by inserting the protrusion parts 222a of the sensing part 220 in the locking grooves 412a of the locking member 412 moved by the solenoid 411 (FIG. 12A). In addition, the sensing part 220 may be rotated in such a manner that the protrusion parts 222a are decoupled from the locking grooves 412a by backward movement of the locking member 412 (FIG. 12B).

Various embodiments have been described in the best mode for carrying out the invention. Although the present invention has been described with respect to the illustrative embodiments, it will be apparent to those skilled in the art that various variations and modifications may be made without departing from the spirit and scope of the invention as defined in the following claims.

[Description of Reference Numerals]

| | |
|---|---|
| 10: shift range switching device for vehicle | 100: cover part |
| 110: top cover | 120: covering |
| 130: middle cover | 131: opening part |
| 200: rotary unit | 210: knob operation part |
| 211: knob cap | 212: knob ring |
| 213: knob | 220: sensing part |
| 221: shaft | 222: moving block |
| 222a: protrusion part | 223: through-hole |
| 224: magnet | 225: slide pin |
| 226: elastic member | 300: control unit |
| 310: parking button | 320: display part |
| 330: sensor | 340: substrate |
| 350: light source | 360: switch |
| 400: body part | 410: locking part |
| 411: solenoid | 412: locking member |
| 412a: locking groove | 413: guide member |
| 420: cam | 421: fixed position |
| 430: body | |

The invention claimed is:

1. A shift range switching device for a vehicle, comprising:
   a cover part;
   a rotary unit comprising a knob operation part exposed to the outside of the cover part, and a sensing part inserted in the knob operation part so as to be rotated by the knob operation part and to sense the rotation of the knob operation part;
   wherein the cover part comprises a middle cover disposed between the knob operation part and the sensing part, the middle cover having an opening formed on one side thereof so as not to protrude beyond an outer peripheral surface of the cover part;
   a control unit comprising a parking button for shifting a transmission to a parking range, a display part for displaying a working range of the transmission, and a sensor for sensing the rotation of the rotary unit; and
   a body part comprising a locking part coupled to or decoupled from the sensing part to restrict the rotation of the rotary unit, a cam in which one side of the sensing part is inserted to allow returning to an original position when the knob operation part is rotated, and a body receiving the locking part and the cam.

2. The shift range switching device according to claim 1, wherein the middle cover is formed so as to be upwardly inclined in an opposite direction from the opening.

3. A shift range switching device for a vehicle, comprising:
a cover part;
a rotary unit comprising a knob operation part exposed to the outside of the cover part, and a sensing part inserted in the knob operation part so as to be rotated by the knob operation part and to sense the rotation of the knob operation part;
a control unit comprising a parking button for shifting a transmission to a parking range, a display part for displaying a working range of the transmission, and a sensor for sensing the rotation of the rotary unit; and
a body part comprising a locking part coupled to or decoupled from the sensing part to restrict the rotation of the rotary unit, a cam in which one side of the sensing part is inserted to allow returning to an original position when the knob operation part is rotated, and a body receiving the locking part and the cam, wherein:
the sensing part comprises a shaft, one end of the shaft being inserted in the knob operation part, the shaft having a through-hole formed to intersect with a longitudinal direction of the shaft in the vicinity of the other end thereof, and a moving block formed between both ends of the shaft; and
the control unit comprises a substrate arranged between the knob operation part and the sensing part, and the parking button, the display part, and the sensor are electrically connected to the substrate.

4. The shift range switching device according to claim 3, wherein a magnet is coupled to the moving block.

5. The shift range switching device according to claim 4, wherein the magnet has a circular arc shape, and has both polarities divided in a longitudinal direction thereof of the magnet.

6. The shift range switching device according to claim 4, wherein the sensor is disposed in the vicinity of the magnet in a side of the substrate.

7. The shift range switching device according to claim 3, wherein a plurality of protrusion parts are formed on the moving block so as to protrude toward an outer peripheral surface of the moving block.

8. The shift range switching device according to claim 3, wherein the sensing part further comprises a slide pin inserted in the through-hole so as to protrude to both sides thereof, and an elastic member interposed between both ends of the slide pin.

9. The shift range switching device according to claim 8, wherein the cam is arranged such that the both ends of the slide pin come into sliding contact with the cam.

10. The shift range switching device according to claim 9, wherein the cam has two fixed positions on an inner peripheral surface thereof for allowing the slide pin to protrude to the maximum, and left and right sides of each fixed position are inclined toward the fixed position.

11. The shift range switching device according to claim 3, wherein the parking button is connected to the substrate through a switch having an elastic force.

12. The shift range switching device according to claim 3, wherein the locking part comprises a solenoid received in the body part, a locking member coupled to the solenoid to be moved forward and backward, and a guide member for guiding forward and backward movement of the locking member on a side of the locking member.

13. The shift range switching device according to claim 12, wherein the locking member has locking grooves facing protrusion parts of the moving block, and the rotation of the rotary unit is restricted when the protrusion parts are inserted in the locking grooves through movement by the solenoid.

* * * * *

UNITED STATES PATENT AND TRADEMARK OFFICE
CERTIFICATE OF CORRECTION

| | | |
|---|---|---|
| PATENT NO. | : 9,845,868 B2 | Page 1 of 1 |
| APPLICATION NO. | : 14/764990 | |
| DATED | : December 19, 2017 | |
| INVENTOR(S) | : Seag Woo Lee et al. | |

It is certified that error appears in the above-identified patent and that said Letters Patent is hereby corrected as shown below:

In the Claims

Column 9, Line 36 reads "thereof of" should read --of--

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*